US008216381B2

(12) United States Patent
Ladret et al.

(10) Patent No.: US 8,216,381 B2
(45) Date of Patent: Jul. 10, 2012

(54) USE OF A LEGUMINOUS STARCH DERIVATIVE FOR COATING PAPER OR FOLDING CARTON AND COATING COMPOSITION CONTAINING SAME

(75) Inventors: Marika Ladret, Lompret (FR); Ludivine Onic, Beuvry (FR)

(73) Assignee: Roquette Freres, Lestrem (FR)

( * ) Notice: Subject to any disclaimer, the term of this patent is extended or adjusted under 35 U.S.C. 154(b) by 329 days.

(21) Appl. No.: 12/517,384

(22) PCT Filed: Dec. 3, 2007

(86) PCT No.: PCT/FR2007/052434
§ 371 (c)(1),
(2), (4) Date: Jun. 3, 2009

(87) PCT Pub. No.: WO2008/074957
PCT Pub. Date: Jun. 26, 2008

(65) Prior Publication Data
US 2010/0058953 A1 Mar. 11, 2010

(30) Foreign Application Priority Data
Dec. 4, 2006 (FR) ...................................... 06 10560

(51) Int. Cl.
*C08L 3/02* (2006.01)
*C09D 103/02* (2006.01)
(52) U.S. Cl. ..................... 127/32; 106/205.01; 162/178
(58) Field of Classification Search ............ 106/205.01, 106/206.1; 536/102, 103; 162/178
See application file for complete search history.

(56) References Cited

U.S. PATENT DOCUMENTS

| 6,512,108 B2 | 1/2003 | Albrecht et al. |
| 6,861,519 B2 | 3/2005 | Backer et al. |
| 2005/0008801 A1* | 1/2005 | Kippenhahn et al. ........ 428/35.7 |
| 2005/0159329 A1 | 7/2005 | Fuertes et al. |
| 2006/0225855 A1 | 10/2006 | Ladret et al. |
| 2007/0066817 A1 | 3/2007 | Mentink et al. |

FOREIGN PATENT DOCUMENTS

| EP | 1 369 432 | 12/2003 |
| EP | 1 548 033 | 6/2005 |
| FR | 2 852 977 | 10/2004 |
| FR | 2 854 898 | 11/2004 |
| FR | 2 855 524 | 12/2004 |
| WO | 97/42225 | 11/1997 |
| WO | 2004/064540 | 8/2004 |
| WO | 2004/088030 | 10/2004 |
| WO | 2005/003456 | 1/2005 |

OTHER PUBLICATIONS

Wajira S. Ratnayake et al., "Pea Starch: Composition, Structure and Properties—A Review", Starch/Starke, 2002, pp. 217-234, vol. 54, Wiley-VCH Verlag GmbH, Weinheim, Germany.
Rudolf Klingler et al., "Saeureabbau Von Starke Unter Semi-Dry Bedingungen /Acid Modification of Starch in a Semi-Dry Process", Starch/Starke, Jan. 1, 1997, pp. 391-395, vol. 49, No. 10, Wiley-VCH Verlag, Weinheim, Germany.
Lucyna Slominska et al., "Low Conversion Starch Hydrolysates", 2002, pp. 31-39, vol. 4, No. 33.

* cited by examiner

*Primary Examiner* — David M Brunsman
(74) *Attorney, Agent, or Firm* — Young & Thompson

(57) ABSTRACT

A method of using at least one leguminous starch derivative having a predetermined molecular mass in weight and a predetermined sol/gel transition temperature for preparing a composition for laying paper or flat carton. The leguminous starch derivative and laying compositions prepared from the same, in particular with high dried materials are also disclosed.

40 Claims, No Drawings

USE OF A LEGUMINOUS STARCH DERIVATIVE FOR COATING PAPER OR FOLDING CARTON AND COATING COMPOSITION CONTAINING SAME

This application is a 371 of PCT/FR2007/052434, filed Dec. 3, 2007.

FIELD OF THE INVENTION

The invention relates to the use of at least one leguminous starch derivative for the preparation of a composition intended for the coating of a paper or folding carton.

It thus relates to a composition intended for the coating of paper or folding carton containing said leguminous starch derivative(s).

It also relates to the leguminous starch derivative, in particular a dextrin, useful for the preparation of the composition according to the invention.

It also relates to the method of production and the preparation of the composition according to the invention and its use in the paper industry, for paper finishing purposes, by any coating operation known to a person skilled in the art, as well as the paper obtained by these means.

BACKGROUND OF THE INVENTION

By "leguminous starch derivative" within the meaning of the invention, is meant any derivative originating from a modification of at least one leguminous starch, chosen from the enzymatic modifications, physical, in particular mechanical, thermal and thermomechanical modifications, and chemical or thermochemical modifications.

By "leguminous starch" within the meaning of the present invention, is meant any starch extracted from legumes, having a high starch content of at least 95% (dry/dry), combined with a low content of colloidal materials and fibrous residues, preferably, less than 1% (dry/dry). The high starch content is preferably greater than 98%.

The protein content is advantageously low, i.e. less than 1%, preferably less than 0.5%, preferably also, comprised between 0.1 and 0.35% (dry/dry).

By "legumes" within the meaning of the invention, is meant the papilionaceae family, the most important representatives of which are firstly the pea, but also the haricot bean, lentil, lupin, broad bean, alfalfa and clover.

By "legumes" within the meaning of the invention, is meant more particularly those for which the amylose content of the starch is less than 60%, in particular comprised between 25 and 55%.

In this group, and according to these considerations, the pea occupies a special position.

Similarly, the invention accords a quite particular place to the dextrins.

By "dextrin" within the meaning of the present invention, is meant a starch modified in dry phase by the action of heat, a combination of heat and a chemical reagent or, optionally, by the action of ionizing radiation.

Numerous methods have been developed, within the context of a rich industrial history, which make use of the action of heat, in a sufficiently dry medium, in the presence or absence of a chemical agent. For the most part, whether they are discontinuous or continuous, they make use of conversion temperatures greater than 100° C. and optionally in the presence of an acid, generally mineral, of an alkaline agent and/or of an oxidizing agent.

The dextrins obtained in the presence of an acid are the most widespread. They are customarily classified in three essential categories containing:

The white dextrins, converted at temperatures often comprised between 120 and 170° C., in the presence of chemical agent(s), in particular of acid, in relatively high quantities, The yellow dextrins, converted at higher temperatures, often comprised between 170 and 230° C., in the presence of low, or even very low quantities of chemical agent(s), in particular of acid, The so-called "British GUM" dextrins converted by the action of heat alone, at a high temperature, often greater than 230° C.

The dextrins obtained by the action of ionizing radiation, which is more recent, are generally not included in this classification.

In most cases, the water content concomitant with the so-called dry phase as understood by a person skilled in the art, is at most equal to a value of approximately 6%.

The methods, considered in a general way, produce different reactions. The importance of each of them varies with essential parameters, such as the level of chemical agent, in particular acid, the initial water content, the temperature profile and the reaction time.

The hydrolysis reaction is significant at the start of the conversion and as from 50° C. Linked to the presence of acid and of a still-sufficient quantity of water, it reduces the molecular mass. It remains important in the conversion of white dextrins.

The condensation or reversion reaction forms an $\alpha(1,6)$ bond from a primary alcohol of one chain and the reducing end of another chain. It is promoted by temperatures less than or close to 150° C.

The "transglucosidation" reaction forming an $\alpha(1,6)$ bond by cutting an $\alpha(1,4)$ bond without releasing water, is predominant at temperatures greater than 150° C. Making it possible to obtain further branched molecules, it is essential to the expression of the properties of the dextrins, in particular, of the yellow dextrins.

Other reactions also take place, such as the internal "anhydration", between carbons 1 and 6 or the recombination resulting from the reaction between a reducing end and a C2, C3 or C4 hydroxyl group.

The importance, in particular the relative importance, of these phenomena confers specific properties on the dextrins.

Although the dextrin obtained is then, in most cases, subjected to an operation intended to rehydrate it, often to facilitate its dispersion and its dissolution in water, its relation to this solvent contributes to the level of branching achieved, in particular due to the "transglucosidation" reaction.

Although the use of modified starches and dextrins in the paper-making field is described, the literature relating to it is divided. On the one hand, it deals with surface application (Size-Press) operations, most often in the absence of other binding agent and, in particular, of any filler and/or pigment. It also deals with coating, despite the long supremacy of latex and petroleum products.

It is generally considered that a surface application operation designates coating of a paper or folding carton, carried out on a paper machine, starting with a composition the dry matter of which is less than 25%, in particular less than 20%, most commonly less than 15%. Often, the composition is of simple manufacture, comprising only water and soluble polymer.

The pigmented surface application characterizes a surface application composition comprising, in addition, a filler and/ or a pigment which occurs only in limited quantities, only slightly modifying the overall dry extract. The latter remains less than 40%, in most cases. It is often less than 30%. The colloidal solutions which constituent the base also have generally less than 25%, often less than 20%, and even 15% dry matter.

By way of reference, there may be mentioned the work "Industrial Uses of Starch and its Derivatives" by J. A. Radley, published by "Applied Science Publishers Ltd." (1976), page 207 et seq. (chapter V, sub-chapter 5.3) of which are devoted to these aspects.

In the same book, a little further on (sub-chapters 5.6 to 5.9), the coating operations are described, in particular concerned with the modified starches and dextrins. By "coating" is then meant, within the context of the invention, a coating carried out on the basis of a complex composition, most often containing, apart from water, natural and/or synthetic binding agents, fillers, pigments, dispersing agents, rheology- or water resistance-improving agents, optical bleaching agents, and others.

They also relate to compositions the dry extract of which remains modest on certain materials (25 to 45%—page 219). It is higher on most specific machines, greater than 40%, generally greater than 50%, and may reach 65% (same page).

The highest levels of dry extracts of compositions are possible as soon as the concentration of the solutions of modified starches and/or of dextrins is suitable. Within the context of the prior art, the useful concentrations of such sizing agents are, as taught for example by the work of Whistler, Bemiller and Paschall "Starch Chemistry and Technology—Second Edition: Industrial Aspects", published by Academic Press in 1984, complementary to the previous work, limited to approximately 40%, in particular in the case of conversions carried out at high temperatures (pages 558 to 565), within the context of starch—latex combinations.

These two works provide the essential ideas governing current practices of finishing paper or folding carton by surface application, pigmented surface application or coating produced from modified starches and dextrins. However, the use of such derivatives, originating from leguminous starches is particularly rare.

The use of modified pea starch is recommended in the European patent EP 1 296 790 which in fact only considers pea starches having a high amylose content. In fact it uses the name ("HA pea starch") without the concept being defined, the description of said patent clearly being insufficient.

In this patent, as in the patent application US 2005/0008801 resulting from it, dry matters of sizing agents appear comprised between 12 and 20%, corresponding to use in surface application at approximately 20%. In any case, these concentrations are highly insufficient for utilization for coating paper.

It appears, on reading the patent EP 0 945 487, previously granted to the same applicants, that by the term "HA" is meant pea starches having an amylose content greater than 60%, the examples stating a higher content, equal to 77.4%.

The contents are crucial for the sought grease-resistance properties, whether in the form of film (EP 0 945 487) or by means of a surface application (EP 1 296 790).

On the other hand, in the U.S. Pat. No. 6,512,108, corresponding to the patent EP 0 945 487, the examples are based, in order to obtain the sought properties, on products having in particular a molecular mass of approximately $2.1 \cdot 10^6$, deemed too high to achieve the sought optimum viscosity and stability values for both sizing agent and slip.

The European patent application EP 1 281 721 considers dextrins originating from various sources, including the pea, without however assigning it any particular importance, on the contrary. Only the surface application is cited in a context where no technical problem attaches to it.

The applicant has himself described, in the international patent application WO 2005/003456, the use of derivatives of leguminous starches for finishing paper. The description takes into account only limited concentrations of the colloidal solutions and the compositions originating from them, concentrations which correspond to practices of surface application and very little to those of coating.

In fact, the examples are very clear from this point of view, considering only sizing agents prepared with 20% dry matter and coatings by surface application techniques, exclusively, with 15% dry matter.

The solutions proposed in these three documents are manifestly insufficient and do not essentially answer current technical problems. They are limited to grease-resistance and the major context of surface application, in the case of one, and also, essentially, to surface application, in the case of the other two. The extent of the problems encountered is, in fact, much wider and their nature manifestly more acute.

In fact, a real need exists to pay great attention to energy, its availability and its cost. The expense which is connected with this means that amylaceous sizing agents have be prepared with the highest levels of dry matter, such that coating compositions are proposed with the most limited water contents. The increases in dry extract must be compatible with the level of viscosity necessary and useful for the satisfactory operation of the equipment.

It is important to ensure, under these conditions of high dry matter levels, the stability and development of the most limited viscosity, both of the sizing agents and of the coating compositions, in particular faced with the parameters of time and temperature.

Other, environmental aspects lead to the limitation, so far as possible, of the proportion of synthetic materials, in particular latexes, the use of which, as a coating binding agent, is widespread.

Moreover, the difficult supply conditions for potato flour lead to the use of this raw material being avoided.

Taking into account the ideas set forth above must obviously remain compatible with all of the economic and, above all, technical criteria whether these are concerned with preparation, operation of the equipment, specifications relating to the characteristics and properties conferred upon the papers produced.

In any case, a real need exists to reconcile the most acute technical problems encountered by the paper-making industry, in particular within the technical context of coating, as posed in the current demanding environment, and in particular:
  to ensure a suitable preparation of the colloidal solution of the amylaceous material with as high a level of dry matter as possible,
  to enable, by limited heat inputs to the production of said solution, an initial gain in energy,
  to allow, as a result, the production of coating compositions, whatever the objective and in particular, for a finishing of the type of those of the external layer ("top coat") type, themselves having the highest dry matter levels,
  to guarantee, both for the colloidal solution and the composition originating from it, sufficient stability, in particular over time, as desired by a person skilled in the art,
  to allow useful energy saving, whether in the making-up of the composition, its deposition on the paper or, above all, its drying, to guarantee, on the other hand, rheological properties suited to the adopted coating technique, such as, in particular, to ensure suitable behaviour of the composition on the machine, to control the paper's absorption and wettability properties, to ensure the physical properties required, in particular with respect to roughness, porosity, stiffness, breaking strength, to supply the optical properties desired for the paper, with regard to its whiteness, its opacity or its gloss, to guarantee the qualities necessary for correct printing, in particular as regards ink transfer, mottling, soiling or set-off, different faults which may certainly originate in the paper, but also in the roughness and porosity after surface application, in the nature of the binding agents and their possible migration, in the nature of the fillers and pigments which can act and correct the faults described above. In particular, "mottling", a phenomenon greatly feared by the printer, can be due to factors affecting the paper, whether the support, the composition and its formulation and/or drying, but also parameters relating to the machine, in particular the nature of the ink, the pressure and/or the speed. In these various possible faults, we essentially distinguish between mottling due to ink transfer ("back trap"), mottling due to the superposition of the inks ("trapping") and wet mottling (action of water).

All these criteria additionally need to be respected in a satisfactory economic context, both in terms of supply and cost price of the source of starch and the cost of its conversion. These economic data incorporate aspects relating to the other ingredients of the composition, which are necessary because of the performance imperatives.

It is moreover necessary to add to these, the costs connected with the recovery and recycling of the papers.

It is also acceptable to take into account aspects relating to the assumed toxicity and the biodegradability of the materials.

Although documents exist which describe the production of compositions useful to different industries, comprising modified starches and dextrins of various origins, it is noted that, apart from the three documents mentioned above, they consider technical problems unknown to the paper-making fields. Under these conditions, a person skilled in the art of paper-making is not in a position to solve his specific problems.

Nevertheless, established knowledge about the subject-matter has allowed specific approaches such as that described, for example, in the international patent application WO 04/076163, which describes the use of dextrins in sizing agents which can be "activated" with water, in solution or in emulsion. No selection relating to the origin of the starch appears in said document.

The international patent application WO 92/18325 describes biodegradable packaging materials using flours or starches, in particular leguminous. The dextrinization in this case is referred to as partial. It is carried out in an extrusion device, apparently at a low temperature which is not specified. That a plasticizer must be presence constitutes a major parameter leading to the assertion that said operation does not correspond to the concept accepted by a person skilled in the art.

The patent application US 2001/0026827 describes the production of dextrins obtained by thermal conversion of a starch originating from the potato, cassava, haricot bean, cereals such as wheat or corn, including amylose-rich corn starch, excluding green pea starch. They are intended to replace fats or gelatin in manufactured food products.

The international patent application WO 00/41576 describes various starches, in particular modified, including dextrins, which are useful to the food industry as so-called "resistant" starches, but is interested only in the properties specific to the field, without dealing with their production conditions.

Similarly, the U.S. Pat. No. 5,512,311 relates only to the food industries. Although it mentions dextrins, in particular those originating from legumes, it does not define them and moreover prefers certain starch ethers.

The international patent application WO 01/60867 describes a particular heat modification method and only considers a low temperature range comprised between 50 and 120° C., preferably comprised between 65 and 110° C., in particular, comprised between 80 and 100° C. As with the patent application US 2001/0026827, it introduces an unusual raw material amidst the most conventional of starch sources, the haricot bean.

The U.S. Pat. No. 6,423,775, although more specifically interested in the dextrins originating from a leguminous starch, does not define them, the latter constituting only an intermediate product leading to a grafted copolymer originating from said starch.

The French patent application FR 2 309 638 relates to a particular method for the hydrolysis of cereal or leguminous flours, the separation of the proteins being subsequent to the conversion of the starch in an apparently aqueous medium. It is however further linked to the conversion to dextrose and the production of dextrins is not disclosed.

In the article "Indigestible Starch of P. Lunatus by Pyroconversion: Changes in Physicochemical Properties" (Starch/Stärke—June 2004—pages 241 to 247), the authors describe the work carried out exclusively on the Lima bean, under relatively mild dextrinization conditions, in particular in terms of temperatures. The dextrins obtained are assessed with regard to the sole criterion of digestibility, specific to food, compared with that exhibited by other legumes, lentils.

Although the article, taken from Starch/Stärke 49 (1997) "Säureabbau von Stärke unter semi-dry Bedingungen", considers pea starch, it deals only with an original conversion, in a semi-dry medium, within the context of a very short residence time in a microwave field, making it possible to access modified starches which are useful for replacing fats in the food industry. Such a method, in a semi-dry phase, does not in particular make it possible to reach the desired level of "transglucosidation" of conventional dextrins.

The article "Structural Studies on pea and potato starches using enzymatic methods" (Carbohydrates Europe—March 1999) uses the term "limit-dextrin" for products treated with amylase(s), without specifying their properties and/or intended uses.

In the same way, other articles, such as, for example, "Characterization of Phosphorus in Starch by P-Nuclear Magnetic Resonance Spectroscopy" (Cereal Chemistry 71(5) 488-493, 1994), "Quantitative Measurement of Total Starch in Cereal Flours and Products" (Journal of Cereal Science 20 (1994) 51-58), "Studies on the Structure of Pea Starch"— Parts 1, 2, 3, 4 (Starch/Stärke 45 (1993)) disclose only purely analytical aspects.

On examination of this set of documents, it appears that the modified starches and the dextrins, in particular originating from leguminous starches, which represent, in fact, a very large family, are poorly described, as regards both their nature and their properties. They have above all been studied for the benefit that they bring to the food industry.

As a result, it appears that none of the documents mentioned, or any combination of several of them, makes it possible to solve the technical problems posed by the coating of paper, in particular of the so-called "top coat" type, or to arrive at derivatives having the desired characteristics and properties.

SUMMARY OF THE INVENTION

It is thus to the applicant's credit to have been able to determine that the use of certain leguminous starch derivatives, in particular pea, made it possible to respond satisfactorily to the technical problems posed by the finishing of paper.

More precisely, it is observed that all of the technical problems are best solved by the use, for the preparation of a paper or folding carton coating composition having a dry matter content greater than 25%, of a leguminous starch derivative characterized in that it concomitantly has a molecular weight, determined according to a test A, at most equal to $0.40.10^6$, and a so-called sol/gel transition or conversion temperature, determined according to a test B, less than 40° C. and, preferably, an amylose content of less than 60%.

A subject of the present invention is also a leguminous starch derivative simultaneously having:
an amylose content of less than 60%,
a molecular weight, determined according to a test A, at the most equal to $0.40.10^6$, and
a sol/gel conversion temperature, determined according to a test B, less than 40° C., preferably less than 30%.

Still greater advantage is drawn from the fact that the leguminous starch derivative has an amylose content comprised between 25 and 55%.

The molecular mass can be determined by the means and methods accessible to a person skilled in the art. The applicant however favours test A, using a molecular sieve with light diffusion detection.

DETAILED DESCRIPTION OF THE INVENTION

On this point, the applicant attaches a certain importance to the selection presented. In fact, although it is possible to use a leguminous starch derivative having a molecular mass greater than $0.40.10^6$ and in particular greater than $0.45.10^6$, their use will lead to an appreciable increase in the viscosity of the sizing agent and, as a result, a smaller gain on the dry extracts of the compositions.

Within the context of test B, the different colloidal solutions are the subject of rheological assessments during a cooling stage, according to currently widely established and widespread principles for the determination of complex viscosities $\eta^*$.

These measurements are carried out using an AR2000 dynamic rheometer, distributed by TA Instrument, using 14/15 mm coaxial cylinders. The linear cooling gradient is comprised between 80 and 5° C., at a rate of 1° C./minute. The colloidal stress constraint varies as a function of the response of the sample tested. The frequency is fixed at 1 Hertz.

Also from this point of view, although it is possible, in general, to use a leguminous starch derivative having a molecular mass greater than $0.40.10^6$, its use will be accompanied by an appreciable increase in the sol/gel conversion temperature, reflecting the reduced stability of the sizing agents, which may pose serious problems for the preparation of the compositions.

It has also been observed that it was still more advantageous to resort to the use of a leguminous starch derivative characterized in that it has a degree of branching, determined according to test C, at least equal to 3%, in particular greater than 4%, preferably at most 12%, and still more preferentially at most 10%.

A degree of branching of approximately 4.4%, for example, represents an estimated increase of approximately 50%, when compared with the initial degree of the so-called native leguminous starch and/or with the degree of branching of a leguminous starch fluidized only by known chemical means or corresponding to the first phase of dextrinization, essentially involving hydrolysis.

Test C ensures the determination of the rate of $\alpha$ 1,6 glucosidic bonds of the leguminous starch derivatives according to the invention by NMR analysis of the proton. The degree of branching is then expressed as a percentage corresponding to the quantity of signal from the proton borne by the C1 of one anhydroglucose unit which binds another anhydroglucose unit by an $\alpha$ 1,6 bond, when the value 100 is given to all of the signals from the protons borne by all the C1s present on said leguminous starch derivatives.

Within this context, the applicant has observed that it was particularly useful to resort to the use of a dextrin originating from a leguminous starch, in particular pea, within the meaning of the present invention, i.e. obtained within the context of a major thermal effect, in particular in acid medium, whether under continuous or discontinuous conditions.

Resorting to the use of these leguminous starch derivatives, in particular of dextrins, makes it possible to address all coating possibilities, in particular within the context of an external layer, commonly called the "top coat".

In fact, the leguminous starch derivatives according to the invention and, in particular, the dextrins originating from them, allow the preparation, as soon as suitable equipment is available, of colloidal solutions with high concentrations, greater than 30% dry matter, or even greater than 40% and even of the order of 50%.

Resorting to still more efficient preparation equipment makes it possible to exceed these dry extract levels without the appearance of any incompatibility in terms of viscosity and stability of the latter.

Thus, it is possible to obtain a paper or paper carton coating composition which is characterized in that it has dry matter content greater than 25%, preferably greater than 30%, still more preferentially, comprised between 35 and 75%, that it contains at least one leguminous starch derivative having a molecular weight at the most equal to $0.40.10^6$, preferably at least equal to $0.04.10^6$, more preferentially at least equal to $0.11.10^6$ and in particular comprised between $0.12.10^6$ and $0.40.10^6$, and a sol/gel conversion temperature of less than 40° C., in particular less than 20° C., advantageously less than 10° C.

It is noted that, interestingly, the temperature of 40° C. corresponds to a minimum temperature for storing the starch sizing agent.

The compositions produced from the leguminous starch derivatives according to the invention, in particular from dextrins, are capable of corresponding to all situations in terms of dry extracts in particular. The latter can be included within a very broad range, from the coating with a low level of dry extract, however slightly greater than 25%, to coating operations using coating compositions which have a dry matter content greater than 30%, in particular comprised between 35 and 75%, in particular comprised between 45 and 73%, in particular, between 50 and 72%.

Dry matter contents as high as 72%, or 73%, and even 75%, mean that for each point gained, there is a very appreciable gain in energy during drying.

The beneficial effect is all the more pronounced when a leguminous starch derivative is used characterized in that it concomitantly has an amylose content comprised between 25 and 55%, a molecular weight at least equal to $0.04.10^6$, preferably at least equal to $0.11.10^6$, in particular comprised between $0.12.10^6$ and $0.40.10^6$ and a sol/gel conversion temperature of less than 20° C., advantageously less than 10° C.

A subject of the present invention is also a leguminous starch derivative characterized by the ranges of amylose content, molecular weight and sol/gel conversion temperature mentioned in the previous paragraph.

Greater advantage is drawn from the fact that, beyond these characteristics, the leguminous starch derivative has a degree of branching, determined according to test C, at least equal to 3%, in particular greater than 4%, preferably at most 12%, and still more preferentially at most 10%.

The highest dry extract levels are obtained all the more easily, and under the best conditions, when the leguminous starch derivative is combined with one or more products of modern technology, themselves intended to improve the rheological behaviour and/or increase the dry matter content in the compositions, such as, for example, hyperbranched polymers such as those described in the international patent applications WO 99/16810, 00/58388 and 00/56804.

In any case, the leguminous starch derivative consists, in a particularly advantageous manner, of a dextrin.

This effect is particularly appreciated under coating conditions where the use of leguminous starch derivatives makes it possible to reduce, appreciably to very appreciably, the conventional synthetic binding agents, whether these are soluble or presented in the form of emulsions (latex).

A coating operation relating to a so-called "top coat" external layer in particular, perfectly well illustrates the possibilities of high dry extract levels and an appreciable reduction in the quantities of latex.

In any case, the properties relative to the viscosity in aqueous solution of the products according to the invention, as well as to the remarkable stability observed, appear completely compatible with all of the technical constraints with which a person skilled in the art is confronted.

These characteristics allow, in the first place, easy preparation of the colloidal solutions with high dry matter levels, within the context of limited heat inputs and a first appreciable gain in energy.

They allow the production of compositions which are useful for coating paper and folding carton, belonging to a very broad range, in particular, capable of ensuring a coating operation ensuring an external layer ("top coat"), and/or those having the highest dry matter levels.

They guarantee, both for the colloidal solution and the composition originating from it, a sufficient stability, in particular over time, as desired by a person skilled in the art.

They allow useful energy saving, whether during the making up of the composition, its deposition on the paper or, above all, its drying.

They guarantee, on the other hand, rheological properties suitable for the adopted surface application technique.

Beyond this, the working conditions for the latter define properties which are essential to the composition, such as a behaviour suited to the machine, for example, relating to the control and absence of projections, water retention or covering the fibres of the support, in particular within the context of the adhesion of the layer to this fibrous support.

Within the context of ensuring sufficient satisfaction for the filing, they ensure the production of a layer, a "top coat" in particular, having the characteristics required for the paper.

The sought qualities are in particular related to the physical properties such as rigidity, breaking strength, porosity, rigidity or smoothness, optical properties such as whiteness, opacity and gloss, as well as control of the absorption and wettability properties of the paper.

Said qualities are shown by tests well known to a person skilled in the art, making it possible to achieve and guarantee suitability for printing by avoiding the various faults described above such as ink transfers, soiling, set-offs and in particular, mottling, which are problematic due to their numerous origins.

The different aspects of the present invention, relating to the formulation and to the production of usual adhesive compositions, in particular those relating to the degree of satisfaction with regard to the abovementioned criteria, will be described in more detail using the examples which follow, which are in no way limitative.

Example 1

Different products were available which were useful for coating the paper, originating from different amylaceous bases:
3 dextrins based on corn starch, CD1, CD2 and CD3, having different molecular masses by weight and different viscosities in colloidal solution, obtained by continuous conversion,
An oxidized corn starch OxCS, as well as
4 oxidized potato flours, OPF1, OPF2, OPF3 and OPF4.

These were compared with 3 dextrins PD1, PD2 and PD3, obtained by continuous method, as well as a fluidized and acetylated pea starch in milk phase, all originating from a pea starch which had a high starch content greater than 98% and a protein content less than 1%.

The dextrin referenced PD1 had precisely been obtained according to a method comprising a continuous heat treatment at 138° C. in a reactor, in the presence of hydrochloric acid at 0.18% by dry weight with respect to the dry weight of starch, the contact time between the acid and the starch being set at 5 minutes and the heat treatment then being continued in order to ensure the internal cross-linking of the starch derivative. The dextrins referenced PD2 and PD3 had been obtained according to a similar method, in which however the quantity of acid utilized and/or the heat treatment temperature were lower.

All these products were analyzed in order to determine their molecular mass by weight according to test A, then subjected to a thermal cooking operation in a Jet-Cooker (water having a hardness of TH 10), for 3 minutes at 140° C., at the end of which the sizing agents obtained, adjusted to 35% dry matter (% DM), were divided into two parts.

One was subjected to a Brookfield viscosity measurement at 60° C. (100 rpm).

The first measurements were the following:

|  | Molecular mass by weight Mw | Brookfield viscosity at 60° C. - 100 rpm (mPa · s) |
| --- | --- | --- |
| Corn dextrin CD1 | $4.2 \cdot 10^4$ | 55 |
| Corn dextrin CD2 | $15 \cdot 10^4$ | 117 |
| Corn dextrin CD3 | $79 \cdot 10^4$ | 240 |
| Oxidized corn starch OxCS | $70 \cdot 10^4$ | 183 |
| Oxidized flour OPF1 | $86 \cdot 10^4$ | 290 |

| | Molecular mass by weight Mw | Brookfield viscosity at 60° C. - 100 rpm (mPa · s) |
|---|---|---|
| Oxidized flour OPF2 | $54 \cdot 10^4$ | 220 |
| Oxidized flour OPF3 | $40 \cdot 10^4$ | 148 |
| Oxidized flour OPF4 | $130 \cdot 10^4$ | 290 |
| Pea dextrin PD1 | $5.42 \cdot 10^4$ | 47 |
| Pea dextrin PD2 | $45 \cdot 10^4$ | 200 |
| Pea dextrin PD3 | $180 \cdot 10^4$ | 350 |
| Fluidized, acetylated pea starch FAPS | $45 \cdot 10^4$ | 210 |

The other part was subjected to complex viscosity measurements, according to test B, within the context of a cooling phase between 80 and 5° C.

| | Complex viscosity 60° C. (mPa · s) | Sol/gel conversion temperature | Dephasing angle at 60° C. |
|---|---|---|---|
| CD1 | 617 | 78° C. | 46 |
| CD2 | 719 | 62° C. | 42 |
| CD3 | 210 | 50° C. | 90 |
| OxCS | 307 | <5° C. | 79 |
| OPF1 | 289 | <5° C. | 79 |
| OPF2 | 197 | <5° C. | 90 |
| OPF3 | 114 | <5° C. | 90 |
| OPF4 | 337 | <5° C. | 89 |
| PD1 | 35 | <5° C. | 90 |
| PD2 | | 44° C. | |
| PD3 | | 45° C. | |
| FAPS | 151 | <5° C. | 90 |

The colloidal solutions involving pea starch, whether these originate from a dextrin according to the invention (PD1) or a fluidized and acetylated pea starch, of suitable molecular masses, exhibited no sol/gel conversion temperature in the cooling phase. The absence of a break point in the viscosity curve reflected the absence of retrogradation in said phase and guaranteed a remarkable stability of the sizing agents at the temperatures of use, even at a high concentration, for example, of the order of 50% DM.

Example 2

Two different pea starch derivatives were available. One was a fluidized and then acetylated pea starch (FAPS2). The other was a pea dextrin according to the invention, obtained by continuous heat treatment in acid medium and at low humidity (PD4). This dextrin had been obtained according to a method similar to that used for producing the dextrin PD1 of Example 1, except that the quantity of acid was 0.10% and the temperature in the reactor 140° C. These two products were subjected to continuous cooking in a "Jet Cooker", for 3 minutes at 140° C., with a dry matter content such that the sizing agents obtained, taking account of the vapour input, were at 35% DM. The sizing agents were characterized in the following manner:

| | Molecular mass by weight Mw | Sol/gel conversion temperature | Brookfield viscosity at 60° C. (mPa · s) | Complex viscosity at 60° C. (mPa · s) | Degree of branching (α-1,6 bonds in %) |
|---|---|---|---|---|---|
| FAPS2 | $0.45 \cdot 10^6$ | 5° C. | 200 | 151 | 2.8 |
| PD4 | $0.39 \cdot 10^6$ | 6° C. | 78 | 35 | 4.4 |

The pea dextrin according to the invention had complex or apparent viscosities less than those of the fluidized and acetylated pea starch, the molecular masses of the two derivatives being however very similar to each other.

This behaviour, correlated to the degree of branching, determined according to test C, was favourable to the preparation of compositions having the highest dry extract levels.

Example 3

The colloidal solutions of Example 1, in this case, were involved in the production of compositions for coating a paper intended for "offset" printing. A dry matter content of approximately 62.5%, a pH of 8.5 and a Brookfield viscosity of 1200 mPa·s at 25° C. (100 rpm) were sought at best. The chosen formulation comprised:
  Pigments: SETACARB® 85, 60 parts
  SUPRAGLOSS® 95, 40 parts,
  Latex: 8 parts, and starch: 5 parts,
  Thickening agent: FINNFIX® (CMC): 0.5 part,
  Dispersant: DISPEX® N40: 0.06 part,
  Insolubilizer: URECOLL® S: 0.5 part,
  Lubricant: NOPCOTE® C104: 0.4 part.

A control was constituted by a formula comprising no starch, designed with 12.5 parts of latex.

Various viscosity measurements were carried out:
  on a Brookfield viscosimeter at 25° C. and 100 rpm (10 $s^{-1}$),
  on an AR2000 rheometer (2500 $s^{-1}$),
  on a Hercules viscosimeter (approximately 40,000 $s^{-1}$),
  on a capillary viscosimeter (1,000,000 $s^{-1}$).

| | Brookfield 100 rpm 10 $s^{-1}$ | AR2000 2,500 $s^{-1}$ | Hercules 40,000 $s^{-1}$ | Capillary $10^6 s^{-1}$ |
|---|---|---|---|---|
| Latex control | 1280 | 67 | 38 | 38 |
| CD1 | 1260 | 81 | 46 | 44 |
| CD3 | 3000 | 160 | 69 | 57 |
| CD2 | 1880 | 134 | 59 | 53.5 |
| FAPS | 3080 | 200 | 66 | 59 |
| PD1 | 1280 | 86 | 48 | 47 |
| OxCS | 2720 | 150 | 62 | 52 |
| OPF2 | 3700 | 204 | 74 | 53 |
| OPF1 | 4800 | 239 | 75 | 61 |
| OPF3 | 2440 | 171 | 69 | 50 |
| OPF4 | 6000 | 242 | 73 | 55 |

Only the most degraded dextrins achieved the objective of viscosities which are of use for coating.

Although they were corn- or pea-based, these Examples 1 and 3 show that the pea dextrin PD1 according to the invention was the only one which made it possible to achieve the objectives set for the stability of the sizing agent, even with a relatively high dry extract level. The viscosity of the coating slip produced with the pea dextrin was satisfactory, in particular compared with the control constituted by the "all latex" formula, whereas the product referenced FAPS led to values which were slightly less satisfactory from this point of view. The pea dextrin was the amylaceous derivative which best guaranteed the rheological properties suited to the adopted surface application technique.

Example 4

Dephasing angle and viscoelasticity measurements were carried out on an AR2000 rheometer at 25° C., as well as water retention capacity measurements, by the so-called "SD Warren" test known to a person skilled in the art.

|  | G' at 25° C. | Delta at 25° C. | Threshold constraint at 25° C. (mPa) | Water retention (sec.) |
|---|---|---|---|---|
| Latex control | 475 | 6 | 4 | 130 |
| CD1 | 419 | 7.5 | 2 | 190 |
| CD3 | 1016 | 9.2 | 4 | 170 |
| CD2 | 707 | 9.4 | 1.6 | 175 |
| FAPS | 977 | 9 | 10 | 145 |
| PD1 | 553 | 7.7 | 5 | 160 |
| OxCS | 1094 | 8 | 6 | 145 |
| OPF2 | 1207 | 9.3 | 8 | 160 |
| OPF1 | 1332 | 8.3 | 15.9 | 170 |
| OPF3 | 1155 | 8.2 | 8 | 180 |
| OPF4 | 1408 | 8.2 | 20 | 145 |

All the compositions had a marked elastic behaviour, revealed by dephasing angles comprised between 6 and 10 degrees, and a rheofluidifying character.

The low-shear complex viscosities were directly linked to the modulus of elasticity G'.

It may be said that, overall, the pea dextrin PD1 according to the invention exhibited a more favourable rheological behaviour than the corn or acetylated hydrolyzed pea starch dextrins.

It is known, moreover, that the compositions having a flow threshold greater than 10 mPa produce problems on the machine, in particular during pumping. This was the case here with two oxidized flours, whereas the acetylated hydrolyzed pea starch exhibited a behaviour which was just acceptable.

The water retention, with the amylaceous products, was greater than that of the "all latex" composition.

Although they were similar to each other, it was however possible to note the excellent behaviour of the dextrins, in particular, the pea dextrin PD1 according to the invention which, even so, had a low molecular mass.

Example 5

In this case a particular kit was used comprising an accessory constituted by a cylinder perforated at its centre, installed on the ACAV Viscosimeter (ACA, distributed by Fanel Solution), instead of the capillary. Thanks to this device it was to appreciate so-called "extensional" or "elongational" viscosities. On this device the composition was subjected to a forced passage under pressure. On the basis thereof, it was possible to calculate the Euler number, which is directly correlated to the extensional viscosity.

$$\text{Euler number} = \frac{P}{1/2 * \rho * v}$$

where P is the pressure exerted on the composition in order to compel it to flow through the opening, $\rho$ is the density of the composition and $\xi$ is the speed of its flow through the opening, at a temperature of 25° C.

This viscosity corresponds to the composition's ability to become elongated under traction or stretching type stress, and not under shearing. This is especially important within the context of contact-less coating.

More generally it makes it possible to appreciate, within the context of the behaviour on the machine and on the industrial installation, the propensity for misting, in particular, at high speed, on a "Film-Press" for example, and optionally, suitability for filtration.

In the present case, the formulae used were 100 parts of HYDROCARB® 90 calcium carbonate to 12 parts of latex, for the control.

They were based on the same carbonate, for the compositions comprising starch, with 10 parts of latex and 3 parts of starch to 100 parts of filler.

The compositions contained a surfactant assayed at 0.2% with respect to water. They had a dry matter content comprised between 62 and 63% and a pH adjusted to 9.0-9.5.

|  | Extensional viscosity (Euler number) |
|---|---|
| Corn dextrin CD2 | 0.926 |
| Fluidized acetylated pea starch FAPS | 1.274 |
| Pea dextrin PD1 | 1.007 |

The modified pea starches and pea dextrins had Euler numbers and "extensional" viscosities greater than those of their homologues obtained from other resources. This finding reflected a greater cohesion under a so-called "elongational" stress, pea-based products allowing better control over the depositions and moreover, those of any spraying on the machine.

Example 6

Most of the coating compositions of Examples 3 and 4 have been used in surface application operations carried out, by means of a blade-type equipment suited to a DIXON pilot coater, on a support with a grammage of 39 g/m², very lightly sized (Cobb Index of approximately 50), at a speed of 30 m/mn. Only the composition originating from the oxidized flour OPF4 could not be coated due to too high a flow threshold, as indicated previously.

The sought deposition was 13 g/m²/side.

All the coated papers obtained were rolled, by a single passage at 90° C. and 3.5 bars, before analyses.

The resistance and stiffness characteristics of the coated paper had in no case been appreciably damaged. We then assessed the characteristics directly affecting the quality of the coating and expected printing, such as the smoothness (Bendtsen), the porosity (Bendtsen), the wettability (Cobb Index), as well as dry evaluations on an IGT device (ink 3804-7 m/s).

|  | Deposition g/m² | Grammage g/m² | Smoothness (ml/mn) | Porosity (ml/mn) | Cobb Index | dry IGT |
|---|---|---|---|---|---|---|
| Support | 0 | 38 | 100 | 99 | 50.1 | 3.5 |
| latex | 14 | 51 | 46 | 5 | 46.2 | 4.29 |
| CD1 | 12.6 | 50 | 48 | 6.5 | 53.5 | 3.66 |

-continued

|      | Deposition g/m² | Grammage g/m² | Smoothness (ml/mn) | Porosity (ml/mn) | Cobb Index | dry IGT |
|------|-----------------|---------------|--------------------|------------------|------------|---------|
| CD3  | 14              | 52            | 40                 | 5                | 49.2       | 2.54    |
| CD2  | 13              | 50.5          | 39                 | 5.5              | 50.4       | 7       |
| FAPS | 13.9            | 52            | 47                 | 6                | 50.9       | 2.87    |
| PD1  | 12.7            | 51.5          | 83                 | 8                | 51.7       | 2.71    |
| OxCS | 14              | 51.5          | 41                 | 5.5              | 49         | 3.18    |
| OPF2 | 13.4            | 51            | 45                 | 7                | 49.2       | 2.71    |
| OPF1 | 12.5            | 50            | 53                 | 7.5              | 51.6       | 3.18    |
| OPF3 | 12.8            | 51            | 35                 | 6                | 39.9       | 5.54    |

As regards smoothness, porosity or wetting properties it was found that all the coated papers had the correct characteristics.

The optical properties were also considered:

|         | Whiteness | Gloss | Opacity |
|---------|-----------|-------|---------|
| Support | 55.3      | 20.6  | 83.8    |
| latex   | 60.3      | 43.4  | 91.55   |
| CD1     | 62.65     | 38    | 91.35   |
| CD3     | 61.2      | 41.7  | 92.15   |
| CD2     | 63.05     | 39.8  | 91.1    |
| FAPS    | 62.8      | 38.1  | 91.9    |
| PD1     | 61.6      | 39.2  | 91.9    |
| OxCS    | 63.25     | 39.9  | 91.4    |
| OPF2    | 61.9      | 39.7  | 91.75   |
| OPF1    | 63.75     | 35.2  | 91.1    |
| OPF3    | 63.6      | 39.8  | 90.3    |

The recorded measurements were suitable. Apart from the high gloss obtained with the "all latex" formula to the detriment of the whiteness, the values proved to be similar.

It may be suggested that, under conditions for the preparation of sizing agents with fairly high and standard dry extract levels (35% DM), and for compositions having moderately high concentrations, the modified pea starches, and the pea dextrin PD1 according to the invention in particular, offered an ease of production due to the rheology and stability of the sizing agents, and a appropriate behaviour of the coating slips on the machine.

The suitable use of these pea derivatives under these conditions of preparation was reinforced by useful physical and optical properties and above all, by very satisfactory printability.

An overall appraisal can consist of a rating for each of the characteristics, ranging from 0, for an insufficient level, to 3, expressing total satisfaction.

Example 6, extended to include a few other data such as stiffness in the machine direction, length in the machine direction and the surface energies (dispersive and polar components according to Owens Wendt 2) thus led to the following rating:

|           | OPF3 | CD2 | OPF1 | FAPS | CD3 | PD1 | CD1 | OxCS |
|-----------|------|-----|------|------|-----|-----|-----|------|
| Whiteness | 1    | 2   | 1    | 2    | 3   | 2   | 2   | 2    |
| Opacity   | 1    | 1   | 1    | 1    | 1   | 1   | 1   | 1    |
| Gloss     | 2    | 2   | 3    | 2    | 2   | 2   | 2   | 2    |
| Optical   | 4    | 5   | 5    | 5    | 6   | 5   | 5   | 5    |
| Roughness | 1    | 1   | 2    | 2    | 1   | 3   | 2   | 1    |
| Porosity  | 1    | 1   | 1    | 1    | 1   | 1   | 1   | 1    |

|                     | OPF3 | CD2 | OPF1 | FAPS | CD3 | PD1 | CD1 | OxCS |
|---------------------|------|-----|------|------|-----|-----|-----|------|
| Stiffness MD        | 1    | 1   | 1    | 1    | 1   | 1   | 1   | 1    |
| Breaking strength MD| 1    | 1   | 1    | 2    | 1   | 2   | 2   | 2    |
| dry IGT             | 1    | 1   | 3    | 3    | 3   | 3   | 3   | 3    |
| physical            | 5    | 5   | 8    | 9    | 7   | 10  | 9   | 8    |
| Cobb 60             | 1    | 2   | 2    | 2    | 2   | 2   | 2   | 2    |
| Energies            | 2    | 3   | 3    | 3    | 3   | 3   | 3   | 3    |
| wettability         | 3    | 5   | 5    | 5    | 5   | 5   | 5   | 5    |
| Water retention     | 1    | 1   | 1    | 0    | 1   | 0   | 1   | 2    |
| TOTAL               | 13   | 16  | 19   | 19   | 19  | 20  | 20  | 20   |

Although subjective, this rating allowed a tendency to emerge which eliminated the products referenced OPF3 and CD2 and showed that the pea dextrin PD1 according to the invention led to paper with qualities similar to those provided by certain of the corn dextrins with which it was compared. Furthermore, the rheological properties of the sizing agents and coating slips gave it a certain advantage.

The invention claimed is:

1. A method for the preparation of a paper or folding carton coating composition, having a dry matter content greater than 25%, comprising the step of preparing a colloidal solution comprising a leguminous starch dextrin having:
    a molecular weight of at most equal to $0.40 \cdot 10^6$, as determined by molecular sieving with light diffusion detection,
    a sol/gel conversion temperature of less than 40° C., as determined using an AR2000 dynamic rheometer, distributed by TA Instrument, with 14/15 mm coaxial cylinders, a linear cooling gradient comprised between 80 and 5° C., at a rate of 1° C./minute, and a fixed frequency of 1 Hertz, and
    an amylose content of less than 60%.

2. The method according to claim 1, wherein said coating composition has a dry matter content greater than 30%.

3. The method according to claim 1, wherein said coating composition consists of a top-coating or external coating composition.

4. The method according to claim 1, wherein said coating composition has a dry matter content comprised between 50 and 72%.

5. The method according to claim 1, wherein the leguminous starch derivative has a molecular weight at least equal to $0.04 \cdot 10^6$.

6. The method according to claim 1, wherein the starch derivative has a sol/gel conversion temperature of less than 20° C.

7. The method according to claim 1, wherein the starch derivative has a degree of branching, of at least equal to 3%, as determined by NMR analysis, and the degree of branching is expressed as a quantity of signal from a proton borne by C1 of one anhydroglucose unit which binds another anhydroglucose unit by an α 1,6 bond, and a value of 100 is given to all of the signals from the protons borne by all of the C1s present on said leguminous starch dextrin.

8. The method according to claim 1, wherein the leguminous starch dextrin has an amylose content comprised between 25 and 55%.

9. The method of claim 1, wherein the dry matter content of said composition is comprised between 35 and 75%.

10. The method of claim 1, wherein the dry matter content of said composition is comprised between 45 and 73%.

11. The method of claim 1, wherein the molecular weight is at least equal to $0.11 \cdot 10^6$.

12. The method of claim 1, wherein the molecular weight is comprised between $0.12 \cdot 10^6$ and $0.40 \cdot 10^6$.

13. The method of claim 1, wherein the sol/gel temperature is less than 10° C.

14. The method of claim 1, wherein the degree of branching is greater than 4%.

15. The method of claim 1, wherein the degree of branching is at most 12%.

16. The method of claim 1, wherein the degree of branching is at most 10%.

17. A coating composition for paper or folding carton, wherein said composition:
has a dry matter content greater than 25%,
contains at least one leguminous starch dextrin having a molecular weight of at the most equal to $0.40 \cdot 10^6$, as determined by molecular sieving with light diffusion detection, and a sol/gel conversion temperature of less than 40° C., as determined using an AR2000 dynamic rheometer, distributed by TA Instrument, with 14/15 mm coaxial cylinders, a linear cooling gradient comprised between 80 and 5° C., at a rate of 1° C./minute, and a fixed frequency of 1 Hertz.

18. The composition according to claim 17, wherein the at least one leguminous starch derivative has a degree of branching of at least equal to 3%, as determined by NMR analysis, and the degree of branching is expressed as a quantity of signal from a proton borne by a C1 of one anhydroglucose unit which binds another anhydroglucose unit by an α 1,6 bond, and a value of 100 is given to all of the signals from the protons borne by all of the C1s present on said leguminous starch dextrin.

19. A method for coating paper or folding carton, in particular for a top-coating or external coating operation comprising the step of using a composition according to claim 17.

20. The coating composition according to claim 17, wherein the dry matter content is greater than 30%.

21. The coating composition according to claim 17, wherein the dry matter content is comprised between 35 and 75%.

22. The coating composition according to claim 17, wherein the molecular weight is at least equal to $0.04 \cdot 10^6$.

23. The coating composition according to claim 17, wherein the molecular weight is at least equal to $0.11 \cdot 10^6$.

24. The coating composition of claim 17, wherein the molecular weight is comprised between $0.12 \cdot 10^6$ and $0.40 \cdot 10^6$.

25. The coating composition of claim 17, wherein the sol/gel conversion temperature is less than 20° C.

26. The coating composition of claim 17, wherein the sol/gel conversion temperature is less than 10° C.

27. The coating composition of claim 17, wherein the degree of branching is greater than 4%.

28. The coating composition of claim 17, wherein the degree of branching is at most 12%.

29. The coating composition of claim 17, wherein the degree of branching is at most 10%.

30. A leguminous starch dextrin having:
an amylose content of less than 60%,
a molecular weight of at the most equal to $0.40 \cdot 10^6$, as determined by molecular sieving with light diffusion detection, and
a sol/gel conversion temperature of less than 40° C., as determined by an AR2000 dynamic rheometer, distributed by TA Instrument, with 14/15 mm coaxial cylinders, a linear cooling gradient comprised between 80 and 5° C., at a rate of 1° C./minute, and a fixed frequency of 1 Hertz.

31. The leguminous starch dextrin according to claim 30, having:
an amylose content comprised between 25 and 55%,
a molecular weight at least equal to $0.04 \cdot 10^6$, and
a sol/gel conversion temperature of less than 20° C.

32. The leguminous starch dextrin according to claim 30, having a degree of branching of at least equal to 3%, as determined by NMR analysis, and the degree of branching is expressed as a quantity of signal from a proton borne by a C1 of one anhydroglucose unit which binds another anhydroglucose unit by an α 1,6 bond, and a value of 100 is given to all of the signals from the protons borne by all of the C1s present on said leguminous starch dextrin.

33. The leguminous starch dextrin according to claim 32, having a degree of branching at the most equal to 12%, as determined by NMR analysis, and the degree of branching is expressed as a quantity of signal from a proton borne by a C1 of one anhydroglucose unit which binds another anhydroglucose unit by an α 1,6 bond, and a value 100 is given to all of the signals from the protons borne by all of the C1s present on said leguminous starch dextrin.

34. The leguminous starch dextrin of claim 30, wherein the sol/gel conversion temperature is less than 30° C.

35. The leguminous starch dextrin of claim 30, wherein the molecular weight is at least equal to $0.11 \cdot 10^6$.

36. The leguminous starch dextrin of claim 30, wherein the molecular weight is comprised between $0.12 \cdot 10^6$ and $0.40 \cdot 10^6$.

37. The leguminous starch dextrin of claim 30, wherein the sol/gel conversion temperature is less than 10° C.

38. The leguminous starch dextrin of claim 30, wherein the degree of branching is greater than 4%.

39. The leguminous starch dextrin of claim 30, wherein the degree of branching is at most 12%.

40. The leguminous starch dextrin of claim 30, wherein the degree of branching is at most 10%.

* * * * *